United States Patent
Sih et al.

(10) Patent No.: US 7,263,349 B2
(45) Date of Patent: Aug. 28, 2007

(54) VELOCITY RESPONSIVE TIME TRACKING

(75) Inventors: Gilbert Sih, San Diego, CA (US); Farrokh Abrishamkar, San Diego, CA (US); Roland Rick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 592 days.

(21) Appl. No.: 10/097,043

(22) Filed: Mar. 12, 2002

(65) Prior Publication Data

US 2003/0176201 A1 Sep. 18, 2003

(51) Int. Cl.
 *H04Q 7/20* (2006.01)
(52) U.S. Cl. ............... 455/414.1; 455/434; 455/441
(58) Field of Classification Search .......... 455/414.1, 455/434, 441, 452.2, 9, 10, 502, 504, 505, 455/506, 67.16, 136, 181.1, 213, 240.1, 266
See application file for complete search history.

(56) References Cited

U.S. PATENT DOCUMENTS

| 5,285,482 A * | 2/1994 | Sehier et al. ............. 375/355 |
| 5,445,028 A * | 8/1995 | Bianchi et al. ............. 73/593 |
| 5,483,676 A * | 1/1996 | Mahany et al. .......... 455/67.14 |
| 5,771,456 A * | 6/1998 | Pon ....................... 455/456.2 |
| 6,198,930 B1 * | 3/2001 | Schipper .................. 455/440 |
| 6,754,255 B1 * | 6/2004 | Yano et al. ................ 375/149 |
| 2002/0041607 A1 * | 4/2002 | Spalink .................... 370/503 |

FOREIGN PATENT DOCUMENTS

| EP | 1130792 | 9/2001 |
| WO | 0011798 | 3/2000 |
| WO | 0120789 | 3/2001 |

OTHER PUBLICATIONS

Sakamoto, Mitsuo, et al., "Adaptive Channel Estimation with Velocity Estimator for W-CDMA Receiver", 2000 IEEE 51st, May 2000, IEEE Vehicular Technology Conference, pp. 2024-2028.
Kawabata, Kazuo, et al., Estimating Velocity Using Diversity Reception:, Vehicular Technology Conference, IEEE 1994, Jun. 8-10, 1994, pp. 371-374.

* cited by examiner

*Primary Examiner*—Jean Gelin
(74) *Attorney, Agent, or Firm*—Thomas R. Rouse; Thien T. Nguyen; Albert J. Harnois, Jr.

(57) ABSTRACT

The velocity of a wireless communications device (WCD) is estimated. In response to this estimated velocity, a tracking speed of a filter is determined that corresponds to the estimated velocity. The filter filters a timing error signal to produce a control signal that controls the timing of a synchronization clock. This synchronization clock may be a finger clock that controls the timing of a pseudonoise (PN) sequence generator configured for despreading a pilot symbol sequence.

31 Claims, 13 Drawing Sheets

VELOCITY RESPONSIVE TIME TRACKING

BACKGROUND OF THE INVENTION

1. Field of the Invention

The present invention relates generally to wireless communications devices. More specifically, the present invention relates to techniques for tracking timing references in signals received by wireless communications devices.

2. Description of the Related Art

Mobile communications devices, such as wireless phones, are often employed in vehicles or other mobile platforms that travel at relatively high velocities. For example, mobile communications devices are often used in automobiles, trains, and airplanes that travel at speeds as fast as several hundred kilometers per hour.

In wireless communications environments, radio frequency (RF) signals are often transmitted between a transmitter and a receiver across a fading channel. When the transmitter and the receiver have a relative velocity with respect to each other, signals received from the fading channel exhibit fluctuations in amplitude and phase. These fluctuations have a peak rate that is a function of this relative velocity. According to this function, as the relative velocity increases, this peak rate also increases.

Signals sent across such fading channels may arrive at the receiver as a number of multipath transmission components. Multipath transmission components are individual RF wavefronts that stem from a single transmission by the transmitter. Multipath transmission components may be caused by wavefront reflections as well as by other physical occurrences. To a receiver, each multipath component appears identical, except for a distinct time shift, and usually a distinct signal strength and a distinct carrier phase.

Many receivers, such as ones employing coherent code division multiple access (CDMA) demodulation, require precise timing references in order to convert received signals into information symbols. These timing references are synchronized to modulation parameters that are associated with the received signals.

For mobile communications devices, such as wireless CDMA telephones, the reception of multiple multipath signal components from a fading channel causes difficulties in maintaining such precise timing references.

A CDMA receiver can distinctly identify and demodulate multipath components that are separated in time by durations greater than or equal to approximately 1.5 PN chips. To perform such identification and demodulation, receivers typically employ functional components called demodulation fingers. However, receivers are typically unable to distinctly identify and demodulate multipath components separated in time by less than approximately 1.5 PN chips. Thus, for such multipath components, a single demodulation finger must do its best to derive a time reference from multiple multipath components that provides optimal demodulation properties.

The maintenance of such derived time references is problematic because as fluctuation rates associated with the fading channel vary, so does the optimal time reference.

Accordingly, what is needed is a system and method that provides velocity responsive tracking of timing references in signals received by a wireless communications device.

SUMMARY OF THE INVENTION

The present invention is directed to a method and system for providing velocity responsive tracking of a timing reference in a signal received by a wireless communications device (WCD). The method and system estimate the velocity of the WCD; determine a tracking speed of a filter that corresponds to the estimated velocity; and filter a timing error signal with the filter to produce a control signal that controls the timing of a synchronization clock. This synchronization clock may be a finger clock that controls the timing of a pseudonoise (PN) sequence generator configured for despreading a pilot symbol sequence.

Determining the tracking speed involves increasing the tracking speed as the estimated velocity increases and decreasing the tracking speed as the estimated velocity decreases. Increases and decreases in the tracking speed are performed by adjusting the bandwidth of the filter.

Also, determining the tracking speed may include mapping the estimated velocity to a velocity range, and selecting a speed that corresponds to the velocity range as the tracking speed.

The device's velocity is estimated by measuring a level crossing rate of a multipath signal. Alternatively, this velocity may be estimated through the periodic monitoring of the device's location through services such as the global positioning system (GPS).

Moreover, the present invention is directed to a time tracking loop filter that filters a timing error signal to produce a control signal for controlling the timing of a synchronization clock in the WCD. The time tracking loop filter includes a velocity to gain translation module that receives an estimated velocity of the WCD and produces a gain signal that corresponds to the estimated velocity. The time tracking loop filter also includes a filter stage having a tracking speed that is determined by the value of the gain signal. The tracking speed determines the extent that fluctuations in the input signal are passed to the control signal.

The present invention advantageously maximizes the signal to noise ratio of signals received by the WCD.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Communications Environment

Figure 1:
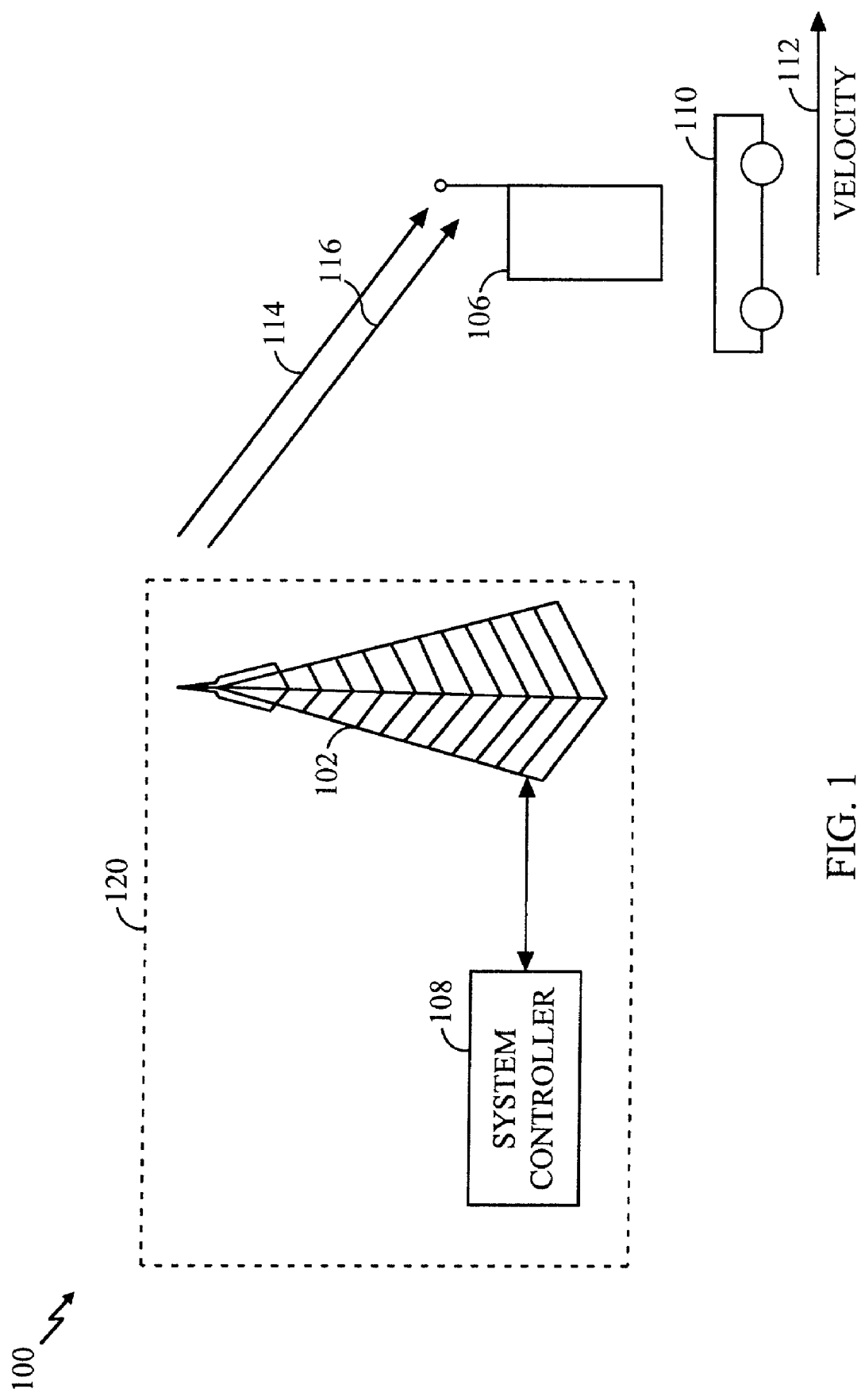
FIG. 1 is a block diagram of an exemplary mobile communications environment.

Before describing the invention in detail, it is helpful to describe an example environment in which the invention may be implemented. The present invention is particularly useful in mobile communications environments. FIG. 1 illustrates such an environment.

FIG. 1 is a block diagram of an exemplary mobile communications environment 100. Communications environment 100 includes a base station 102, a system controller 108, a wireless communications device (WCD) 106, and a mobile platform 110.

Base station 102 is coupled to system controller 108. Together, base station 102 and system controller 108 are part of a wireless communications system (WCS) 120 that exchanges information with WCD 106. This information exchange provides services, such as cellular telephony and personal communications system (PCS) applications.

This exchange of information between WCS 120 and WCD 106 occurs across various communications channels. Of these various communications channels, a pilot channel 114 and a traffic channel 116 are shown in FIG. 1. These channels enable the transfer of information from base station 102 to WCD 106. Pilot channel 114 and traffic channel 116 may undergo fading in a mobile environment. Thus, WCD 106 receives signals from these channels that exhibit fluctuations in amplitude and phase. These fluctuations have a peak rate that is proportional to the velocity of WCD 106.

Traffic channel 116 carries traffic signals conveying information, such as digitally encoded voice and data. Pilot channel 114 carries pilot signals to WCD 106 from base station 102. Pilot signals enable WCD 106 to determine the timing of traffic signals transmitted across traffic channel 116. This timing determination enables WCD 106 to receive and process information contained in the traffic signals.

These traffic signals and pilot signals are CDMA signals. CDMA signals are generated from symbol sequences through channelizing and spreading processes. Spreading involves multiplying a symbol sequence with a spreading sequence, such as a pseudonoise (PN) sequence. Channelizing involves the use of orthogonal channelizing codes, such as Walsh codes. Such codes enable multiple transmissions to simultaneously share portions of the radio frequency (RF) spectrum without interference.

An exemplary CDMA signal generation process involves channelizing a symbol sequence, such as a stream of binary bits, with a Walsh code, and then spreading the "channelized" sequence with a quadrature pair of PN sequences. This spreading function produces an in-phase (I) CDMA sequence, and a quadrature (Q) CDMA sequence. These in-phase and quadrature sequences (not shown) are then modulated through quadrature phase shift keying (QPSK) and transmitted to WCD 106 as an RF signal.

As described above, pilot signals transmitted across pilot channel 114 provide timing references for traffic signals transmitted across traffic channel 116. These timing references allow WCD 106 to synchronize its demodulator to the spreading and channelization functions performed by base station 102 so that the traffic symbols transmitted by base station 102 can be coherently demodulated.

Traffic signals transmitted across traffic channel 116 carry information sequences. Base station 102 encodes and interleaves information sequences into blocks, referred to herein as frames, before performing the channelizing and spreading operations described above.

WCD 106 is a communications device, such as a portable telephone. As illustrated in FIG. 1, WCD 106 is attached to mobile platform 110. Mobile platform 110 has a motion that is defined by velocity vector 112. This motion affects the rate of fluctuations in RF signals that WCD 106 receives from base station 102. Mobile platform 110 may be an automobile, a train, an airplane, or any other platform capable of transporting WCD 106 at velocities that affect the fading characteristics of RF signals received from channels 114 and 116.

Communications Device

Figure 2:
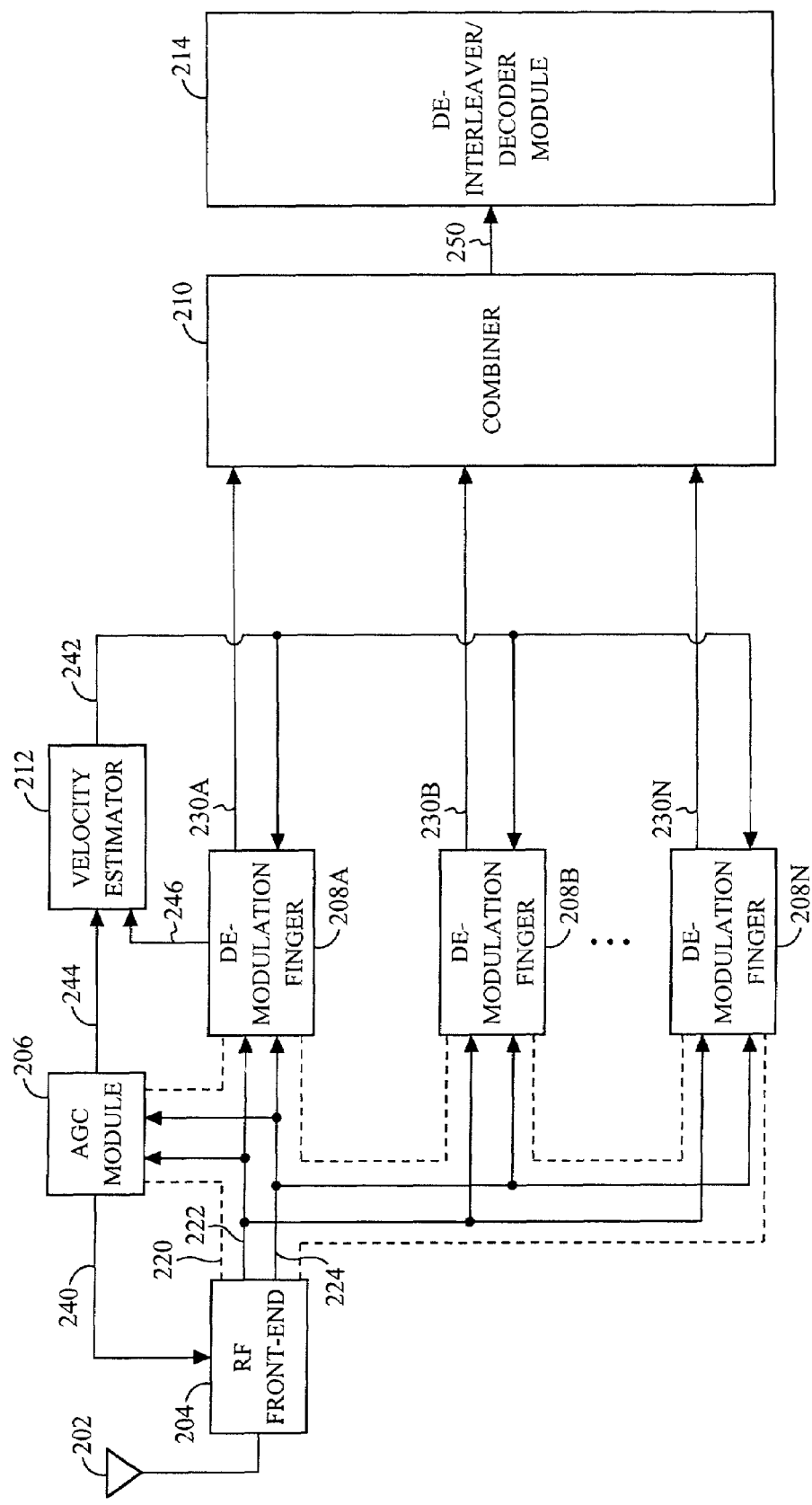
FIG. 2 is an illustration of a receiver portion of a wireless communications device.

FIG. 2 is an illustration of a receiver portion 200 of WCD 106. Receiver portion 200 includes an antenna segment 202, an RF front end 204, an automatic gain control (AGC) module 206, a plurality of demodulation fingers 208a through 208n, a combiner 210, and a velocity estimator 212.

Antenna segment 202 receives radio frequency (RF) transmissions from one or more base stations, such as base station 102. Antenna segment 202 forwards these transmissions as electrical signals to RF front end 204.

The RF transmissions received by antenna segment 202 include pilot signals and traffic signals transmitted across pilot channel 114 and traffic channel 116, respectively. Each of these received signals may be a composite signal that includes a plurality of multipath components. Multipath components are individual RF wavefronts emitted by the same RF transmitter, but which arrive at a receiving antenna along different paths. These different paths are the result of wavefront reflections caused by physical terrain and structure surrounding WCD 106, as well as other physical occurrences in the RF transmission environment. The multipath components of a particular RF signal are substantially identical, except for a distinct time shift, power level, and carrier phase.

For the communications environment shown in FIG. 1, pilot signals and traffic signals sent across pilot channel 114 and traffic channel 116 may each have a plurality of multipath components. These multipath components will be grouped in signal pairings that include a pilot signal multipath component and a traffic signal multipath component. These paired multipath components will have substantially identical propagation delays, power attributes, and phase attributes. As will be described below, WCD 106 identifies and processes these signal pairings in functional components referred to herein as demodulation fingers. These components are described below in greater detail with reference to FIG. 3.

In addition to receiving RF signals from one or more base stations, antenna segment 202 may receive electrical signals for wireless transmission from a transmit power amplifier (not shown) within WCD 106. Additionally, to enable the simultaneous transmission and reception of RF signals through a single antenna within antenna segment 202, antenna segment 202 may also include a diplexer (not shown).

RF front end 204 receives electrical signals from antenna segment 202 within an RF frequency band. Examples of RF frequency bands include a cellular frequency band centered at 800 MHz, and a personal communications services (PCS) communications band centered at 1.9 GHz. Upon reception, RF front end 204 down converts these electrical signals from the RF frequency band to baseband. In addition, RF front end 204 may filter the electrical signals received from antenna segment 202 in accordance with a predetermined bandwidth.

RF front end 204 also includes amplification components (not shown) that increase the power of RF signals, such as pilot and traffic signals, received by antenna segment 202. Exemplary amplification components include a low noise amplifier (LNA) to initially amplify signals upon reception by antenna segment 202, and a variable gain amplifier (VGA) to amplify these signals after they are mixed down to an intermediate frequency (IF) during the down conversion process described above. One or more of these amplification components have variable gains that are controlled by AGC module 206. After downconversion to baseband, RF front end 204 passes the analog baseband signal through an analog-to-digital converter to transform the analog baseband signal into digital baseband signal set 220.

Baseband signal set 220 includes an in-phase (I) signal component 222 and a quadrature (Q) signal component 224. Like the incoming RF signals received by antenna segment 202, baseband signal set 220 includes a plurality of component signals. These component signals may include a plurality of multipath transmission components relating to one or more pilot channels 114 and traffic channels 116.

AGC module 206 adjusts the gain of amplification components within RF front end 204. These adjustments maintain signal set 220 at a substantially constant power level. AGC module 206 performs these adjustments in response to feedback received from signal set 220. This feedback is used to measure the energy of signal set 220.

These adjustments performed by AGC module 206 involve sending a gain control signal 240 to RF front end 204. Gain control signal 240 may include a plurality of component signals, where each of these component signals corresponds to a particular amplification component within RF front end 204. These control signals may be analog or digital, and convey a gain setting for the corresponding amplification component.

Velocity estimator 212 receives a voltage estimate 244 from AGC module 206 and a baseband pilot sequence set 246 from within one of demodulation fingers 208. Voltage estimate 244 is processed by velocity estimator 212 to provide a velocity estimate signal 242 that is sent to each demodulation finger 208. Velocity estimate signal 242 indicates the magnitude of velocity vector 112. Each demodulation finger 208 utilizes this velocity information to control its synchronization with multipath signal component(s) received from pilot channel 114. Various implementations of velocity estimator 212 are described below with reference to FIGS. 12 and 13.

RF front end 204 passes baseband signal set 220 into each of demodulation fingers 208a-n. In turn, each demodulation finger 208 identifies and tracks a distinct signal pairing from baseband signal set 220. As described above, these signal pairings each include a pilot signal component and a time-aligned traffic signal component. Thus, demodulation fingers 208a-n may each individually track and receive a pilot signal component and a traffic signal component sharing the same multipath delay.

Demodulation fingers 208 track multipath components by integrating received pilot signals over a period of time to separate the power in one multipath component from the total received power. This period of time is based on RF fading characteristics.

Each of demodulation fingers 208 processes its respective signal pairing and outputs a corresponding symbol sequence 230. These symbol sequences are sent to combiner 210.

Symbol sequences 230 match corresponding symbol sequences that were spread, encoded, modulated, and transmitted across traffic channel 116 by base station 102.

Upon output from each of fingers 208, symbol sequences 230 are summed by combiner 210, thereby producing a single symbol sequence 250. Before summation, each individual sequence 230 may be weighted and/or processed in manners to optimize the quality of combined symbol sequence 250, as would be apparent to persons skilled in the relevant arts. Combiner 210 sends combined symbol sequence 250 to a deinterleaver/decoder module 214.

Figure 3:
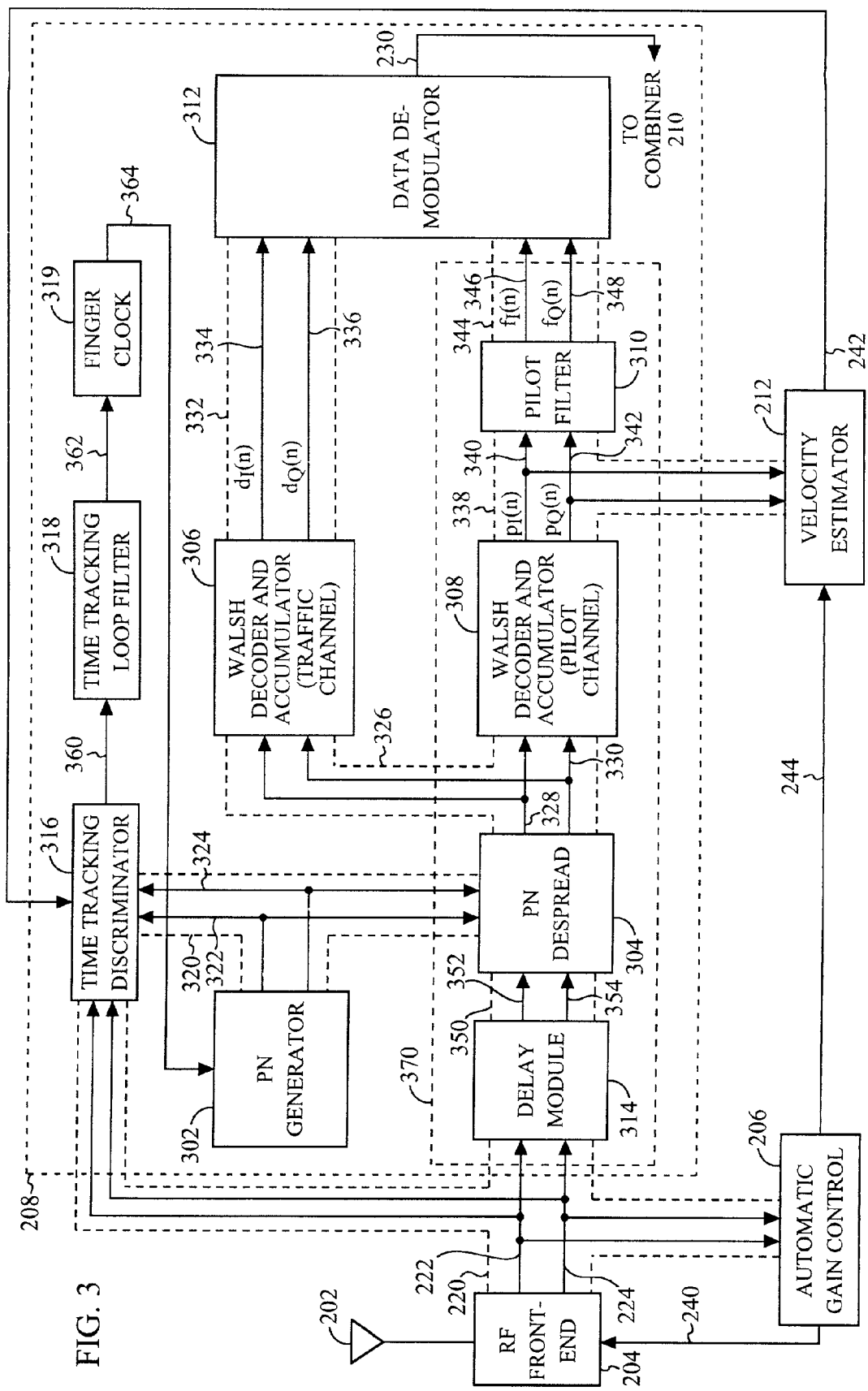
FIG. 3 is a block diagram illustrating an implementation of a demodulation finger.

FIG. 3 is a block diagram illustrating an implementation of finger 208. This particular implementation provides information to velocity estimator 212. As shown in FIG. 3, finger 208 includes a PN sequence generator 302, a PN despreader 304, a traffic channel decoder 306, a pilot channel decoder 308, a pilot filter 310, a data demodulator 312, a delay module 314, a time tracking discriminator 316, a time tracking loop filter 318, and a finger clock 319 (also referred to herein as synchronization clock 319). Delay module 314, PN despreader 304, decoder 308, and pilot filter 310 are within a pilot signal processing path 370.

Delay module 314 receives signal set 220 from RF front end 204 and imparts a one-half chip delay on this signal set. A chip denotes the duration of a symbol generated by PN sequence generator 302. As a result of this delay, delay module 314 produces on-time sequence set 350, which includes an in-phase (I) sequence 352 and a quadrature (Q) sequence 354. On-time sequence set 350 is sent to PN despreader 304.

PN sequence generator 302 generates a PN sequence set 320 that is sent to PN despreader 304 and time tracking discriminator 316. PN sequence set 320 includes an in-phase (I) PN sequence 322, which is time-aligned with I sequence 352, and a quadrature (Q) PN sequence 324, which is aligned with Q sequence 354. This time-alignment is achieved through an alignment signal 364 that is generated by finger clock 319 as a result of processing features performed by time tracking discriminator 316 and time tracking loop filter 318. These processing features are described in greater detail below.

PN despreader 304 receives baseband signal set 350 and processes it with PN sequence set 320 to produce despread signal set 326. Despread signal set 326 includes an in-phase (I) despread signal 328 and a quadrature (Q) despread signal 330. PN despreader 304 sends despread signal set 326 to decoders 306 and 308.

Decoder 306 correlates despread signal set 326 with one or more channelizing codes to produce decovered data sequence values that are accumulated to form baseband traffic sequence set 332. Traffic sequence set 332 includes an in-phase traffic sequence 334 and a quadrature traffic sequence 336.

Decoder 308 decodes a pilot signal contained in despread signal set 326 through the decovering and accumulation techniques described above with reference to decoder 306. This decoding produces a baseband pilot sequence set 338. Pilot sequence set 338 includes an in-phase pilot sequence 340 and a quadrature pilot sequence 342. Pilot sequence set 338 is sent to pilot filter 310. In addition, pilot sequence set 338 is sent to velocity estimator 212. Thus, with reference to FIG. 2, pilot sequence set 338 is sent to velocity estimator 212 as pilot sequence 246.

Decoders 306 and 308 perform decoding operations that involve the use of orthogonal channelizing codes, such as Walsh codes. The channelizing codes employed by decoders 306 and 308 correspond to channelizing codes employed by encoding functionality within base station 102.

Pilot signals are used as a phase reference for the demodulation of traffic signals. The ability of WCD 106 to demodulate traffic signals is directly affected by the signal-to-noise ratio (SNR) of received pilot signals. Pilot filter 310 filters baseband sequence set 338 to eliminate noise from pilot sequence set 338, thereby increasing its SNR.

This filtering process produces a filtered pilot sequence set 344, which is sent to data demodulator 312. Filtered pilot sequence set 344 includes an in-phase (I) filtered pilot sequence 346 and a quadrature (Q) filtered pilot sequence 348. Pilot filter 310 is a low pass filter.

Data demodulator 312 receives sequence sets 332 and 344. Data demodulator 312 retrieves a phase reference from filtered pilot sequence set 344. This phase reference enables data demodulator 312 to coherently demodulate baseband traffic sequence set 332 into symbol sequence 230. Output signal 230 is sent to combiner 210. The accuracy of the phase reference can be improved through velocity responsive time tracking. This feature is described in greater detail below.

Time tracking discriminator 316 receives signal set 220 from RF front end 204. From signal set 220, time tracking discriminator 316 generates "early" and "late" pilot sequences. Time tracking discriminator 316 processes these sequences to determine whether the timing of PN sequence generator 302 needs to be adjusted. Details regarding the processing of these "early" and "late" sequences are described below with reference to FIG. 4. Time tracking discriminator 316 generates a discriminator signal 360 that is sent to time tracking loop filter 318.

Time tracking loop filter 318 receives discriminator signal 360 and filters this signal to determine whether the timing of finger clock 319 needs to be advanced or retarded. As a result of this filtering, time tracking loop filter 318 sends an advance/retard control signal 362 to finger clock 319. Control signal 362 governs the synchronization of finger clock 319.

Figure 4:
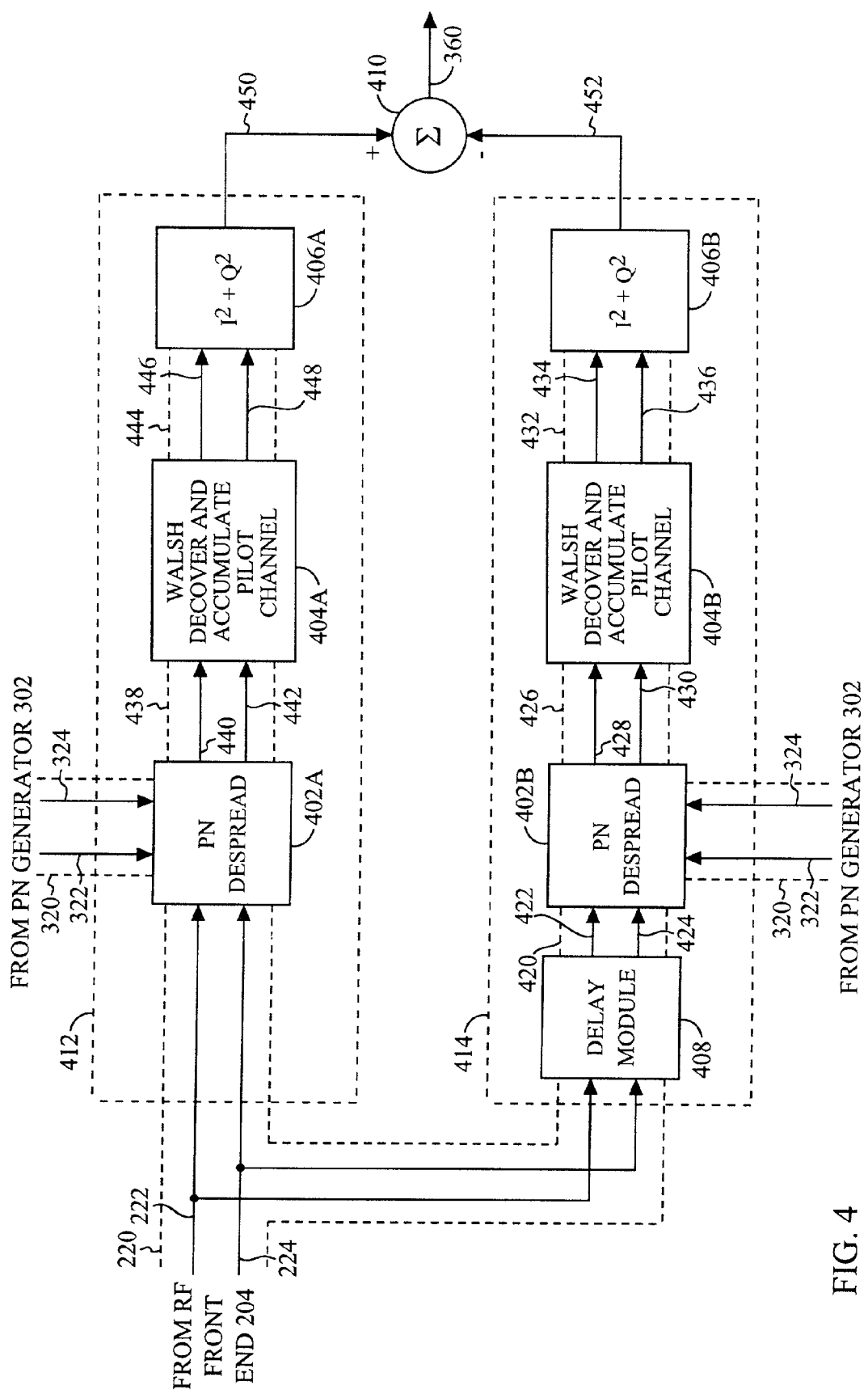
FIG. 4 is a block diagram illustrating a time tracking discriminator.

FIG. 4 is a block diagram illustrating an implementation of time tracking discriminator 316 in greater detail. However, it is important to note that the present invention may employ other implementations of time tracking discriminator 316, such as a tau-dither implementation. The implementation of FIG. 4 includes PN despreaders 402a and 402b, decoders 404a and 404b, energy calculation modules 406a and 406b, a delay module 408 and a combining node 410. Together, PN despreader 402a, decoder 404a, and energy calculation module 406a are within an early processing path 412. Similarly, delay module 408, PN despreader 402b, decoder 404b, and energy calculation module 406b are within a late processing path 414.

Processing paths 412 and 414 both receive baseband signal set 220. Like pilot signal processing path 370, these paths process pilot signal components within signal set 220. However, through the use of time delay functionality, paths 412 and 414 process these pilot signal components at different time offsets.

As noted above, delay module 314 of pilot signal processing path 370 imparts a one-half chip delay on signal set 220. By not imparting any time delay on signal set 220, path 412 processes pilot signals one-half chip "earlier" than pilot signal processing path 370.

Processing path 412 receives signal set 220 at PN despreader 402a. Like PN despreader 304, despreader 402a receives PN sequence set 320 from PN generator 302. PN despreader 402a processes signal set 220 with PN sequence set 320 to produce despread signal set 438. Despread signal set 438 includes an in-phase (I) despread signal 440 and a quadrature (Q) despread signal 442.

PN despreader 402a sends despread signal set 438 to decoder 404a. Decoder 404a decodes a pilot signal contained in despread signal set 438 through the decovering and accumulation techniques described above with reference to decoder 306. This decoding produces an early baseband pilot sequence set 444, which includes an in-phase (I) sequence 446 and a quadrature (Q) sequence 448.

Early baseband pilot sequence set 444 is sent to energy calculation module 406a. Energy calculation module 406a calculates the energy of sequence set 444, which is sent to combining node 410 as an early energy signal 450. This calculation includes performing a sum of squares calculation according to Equation (1), below.

$$E = I^2 + Q^2 \qquad (1)$$

In Equation (1), E represents early energy signal 450, I represents a value of in-phase sequence 446, and Q represents a value of quadrature sequence 448.

In contrast to early processing path 412, processing path 414 includes delay module 408, which imparts a one chip delay on signal set 220. Thus, path 414 processes pilot signals one-half chip "later" than pilot signal processing path 370. Delay module 408 produces delayed signal set 420. Signal set 420 includes an in-phase (I) sequence 422 and a quadrature (Q) sequence 424.

Signal set 420 is sent to PN despreader 402b. Like PN despreaders 304 and 402a, despreader 402b receives PN sequence set 320 from PN generator 302. PN despreader 402b processes delayed signal set 420 with PN sequence set 320 to produce despread signal set 426. Despread signal set 426 includes an in-phase (I) despread signal 428 and a quadrature (Q) despread signal 430.

PN despreader 402b sends despread signal set 426 to decoder 404b. Decoder 404b decodes a pilot signal contained in despread signal set 426 through the decovering and accumulation techniques described above with reference to decoders 306 and 404a. This decoding produces a late baseband pilot sequence set 432, which includes an in-phase (I) sequence 434 and a quadrature (Q) sequence 436.

Late baseband pilot sequence set 432 is sent to energy calculation module 406b. Energy calculation module 406b calculates the energy of sequence set 432, which is sent to combining node 410 as a late energy signal 452. This calculation includes performing a sum of squares calculation according to Equation (2), below.

$$E = I^2 + Q^2 \qquad (2)$$

In Equation (2), E represents late energy signal 452, I represents a value of in-phase sequence 434, and Q represents a value of quadrature sequence 436.

Energy signals 450 and 452 are combined by combining node 410. Combining node 410 performs this combining by subtracting signal 452 from signal 450. This subtraction produces discriminator signal 360, which is sent to time tracking loop filter 318.

Early energy signal 450 represents the energy of a non-delayed pilot signal component despread by PN sequence set 320.

In contrast to early energy signal 450, late energy signal 452 represents the energy of a delayed pilot signal component despread by PN sequence set 320.

By subtracting signal 452 from signal 450, combining node 410 measures a difference in symbol energy between early and late pilot signals. Time tracking loop filter 318 uses this difference, which is shown in FIG. 3 as discriminator signal 360, as a discriminator to determine whether the synchronization of finger clock 319 needs to be adjusted.

Figure 5:
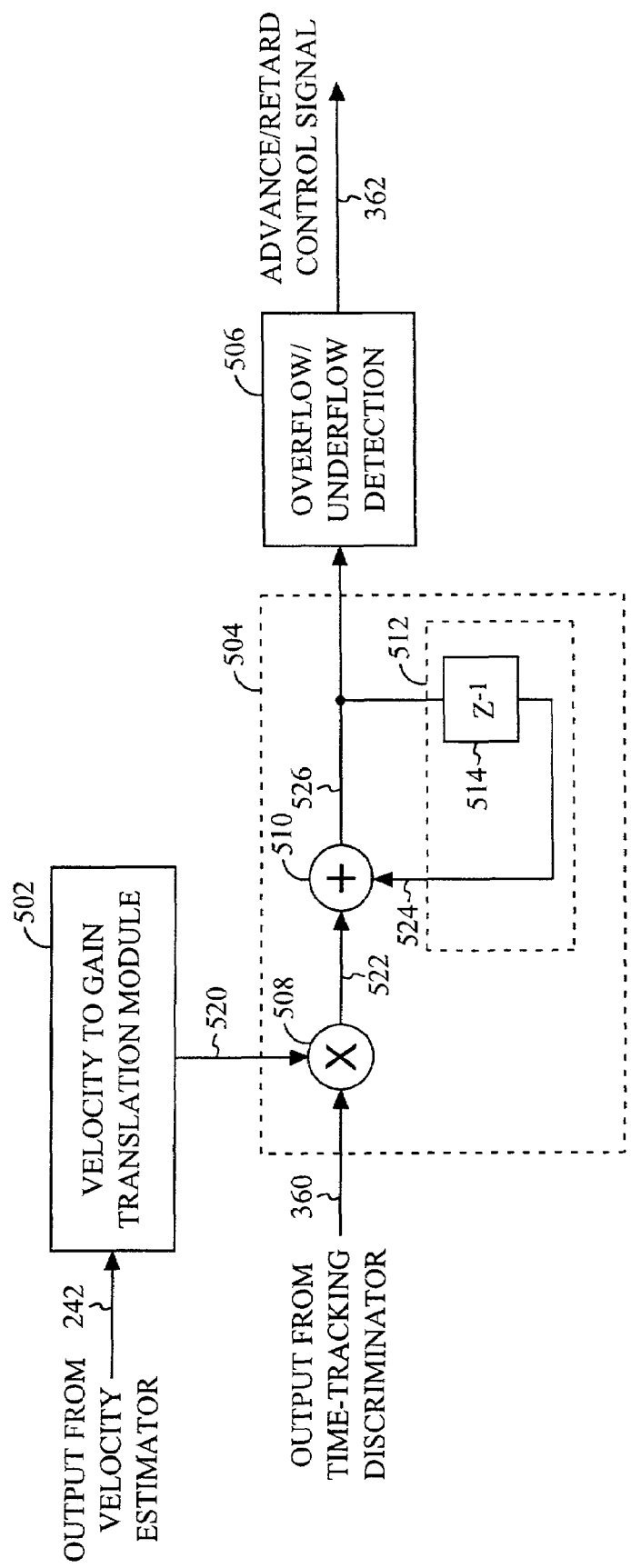
FIG. 5 is a block diagram illustrating a time tracking loop filter.

FIG. 5 is a block diagram of an implementation of time tracking loop filter 318. Time tracking loop filter 318 includes a velocity to gain translation module 502, a filter stage 504, and an overflow/underflow detection module 506. Filter stage 504 includes a multiplication node 508, a summation node 510, and a feedback loop 512.

Time tracking loop filter 318 has an adjustable response time (also referred to herein as tracking speed) that characterizes its ability to pass fluctuations in discriminator signal 360 to advance/retard control signal 362. As tracking speed increases, the ability of filter 318 to pass such fluctuations also increases. Time tracking loop filter 318 also has a bandwidth, which determines tracking speed. Namely, as the bandwidth of time tracking loop filter 318 increases, so does its tracking speed.

Velocity to gain translation module 502 receives velocity estimate signal 242 from velocity estimator 212. Upon receipt of this signal, velocity to gain translation module 502 produces a gain signal 520. The tracking speed of time tracking loop filter 318 is a function of the value of gain signal 520. According to this function, the tracking speed increases as gain signal 520 increases.

Gain signal 520 is produced by translating velocity estimate signal 242 values to gain signal 520 values that correspond to particular ranges of signal 242. Thus, velocity to gain translation module 502 dynamically adjusts the value of gain signal 520 to provide tracking speeds in response to the velocity of WCD 106. This dynamic adjustment feature improves WCD 106 performance by maximizing the SNR of pilot signals received by data demodulator 312. The generation of gain signal 520 is described in greater detail below with reference to FIGS. 8A-8C.

An implementation of velocity to gain translation module 502 may include a lookup table (not shown) that maps ranges of velocity signal 242 values to corresponding gain signal 520 values. Alternatively, velocity to gain translation module 502 may produce gain signal 520 by performing a mathematical calculation that uses velocity estimate signal 242 as an argument.

Within filter stage 504, multiplication node 508 receives gain signal 520 and multiplies it with signal 360, which is received from time tracking discriminator 316. This multiplication produces an intermediate signal 522. Intermediate signal 522 is sent to summation node 510.

Summation node 510 sums intermediate signal 522 and a feedback signal 524 that is received from feedback loop 512. As a result, summation node 510 produces a filtered signal 526. Filtered signal 526 is sent to overflow/underflow detection module 506 and feedback loop 512.

Feedback loop 512 includes a delay module 514 that incurs a one-symbol delay on filtered signal 526. By incurring this delay, delay module 514 produces feedback signal 524. As described above, feedback signal is sent to summation node 510.

Overflow/underflow detection module 506 processes filtered signal 526 to generate advance/retard control signal 362. This processing includes determining whether the value of filtered signal 526 is within a predetermined range. If so, then detection module 506 generates a control signal 362 that does not change the synchronization of finger clock 319. However, if the value of filtered signal 526 is outside of the predetermined range (i.e., either an underflow or an overflow occurs), then a control signal 362 is generated that changes the synchronization of finger clock 319. In addition, when overflow/underflow detection module 506 detects either an underflow or an overflow, filter 504 is reset by setting filtered signal 526 to a predetermined value.

Specifically, if the value of filtered signal 526 is greater than the predetermined range, a control signal 362 is then generated that commands finger clock 319 to be advanced by a predetermined amount (e.g., one-eighth of a chip). However, if the value of filtered signal 526 is less than the predetermined range, a control signal 362 is then generated that commands finger clock 319 to be retarded by a predetermined amount (e.g., one-eighth of a chip).

Velocity Responsive Time Tracking

As described above, the tracking speed of time tracking loop filter 318 is dynamically adjusted in response to the velocity of WCD 106. More particularly, velocity to gain translation module 502 adjusts the tracking speed of time tracking loop filter 318 to match the peak rate of fluctuations in signals received over channels 114 and 116. This matching feature enables finger clock 319 to be optimally synchronized. This optimal synchronization maximizes the SNR of pilot sequence set 344.

Velocity responsive time tracking advantageously provides optimal synchronization for demodulation finger(s) 208 that are demodulating "fat paths." A fat path is a multipath signal component having a plurality of multipath signal subcomponents that are separated in time by less than approximately 1.5 chips.

For a finger 208 demodulating a fat path, the optimal synchronization of its finger clock 319 depends on the amplitude and phase of each of the fat path subcomponents. An example of this dependence is illustrated by two fat path scenarios. In the first scenario, a finger 208 is tracking a signal component having two subcomponents that are equal in amplitude and in-phase with each other. In this scenario, the respective finger clock 319 timing is optimally synchronized directly in the center of the two subcomponents.

In the second scenario, a finger 208 is tracking a signal component that also has two subcomponents. However, in this scenario, these subcomponents are unequal in amplitude and in-phase with each other. For this scenario, the respective finger clock 319 timing is optimally synchronized closer to the stronger subcomponent than to the weaker subcomponent.

As described above, signals received over channels 114 and 116 exhibit fluctuations having a peak rate that is proportional to the velocity of WCD 106. For a demodulation finger 208 operating in a fat path environment, these fluctuations require timing adjustments to finger clock 319 to maintain optimal synchronization. Additionally, for fat path scenarios, the optimal timing reference of finger clock 319 varies at a rate that is proportional to the peak fluctuation rate.

The greater the tracking speed of time tracking loop filter 318, the greater its susceptibility to jitter. Jitter describes oscillations in control signal 362 that occur during a steady state situation when finger clock 319 requires little or no adjustment to maintain optimal synchronization of its corresponding finger 208. Jitter can be caused by system noise, as well as spurious occurrences associated with channels 114 and 116.

Decreasing the tracking speed of time tracking loop filter 318 reduces the amount of jitter in control signal 362. However, an excessive reduction to this tracking speed will prevent legitimate variations from passing to control signal 362. Legitimate variations are variations in discriminator signal 360 that indicate a legitimate need for an adjustment to finger clock 319.

Accordingly, the present invention provides a technique that prevents excessive jitter from appearing in control signal 362. This technique also prevents the preclusion of legitimate variations from appearing in control signal 362.

As described above, for fat path scenarios, the optimal timing reference of finger clock 319 varies at a rate that is proportional to the velocity of WCD 106. Because of this relationship, for a particular tracking speed (i.e., a particular value of gain signal 520), time tracking loop filter 318 provides optimal synchronization across a corresponding velocity range that is defined by a lower velocity threshold, $V_L$, and an upper velocity threshold, $V_U$.

When the velocity of WCD 106 exceeds $V_U$, time tracking loop filter 318 is not fast enough to track the dynamically changing peak location. Therefore, the demodulation performance of corresponding finger 208 becomes impaired. Similarly, when the velocity of WCD 106 falls below $V_L$, time tracking loop filter 318 incurs excessive jitter. This excessive jitter also impairs the demodulation performance of the corresponding finger 208.

Figure 6:
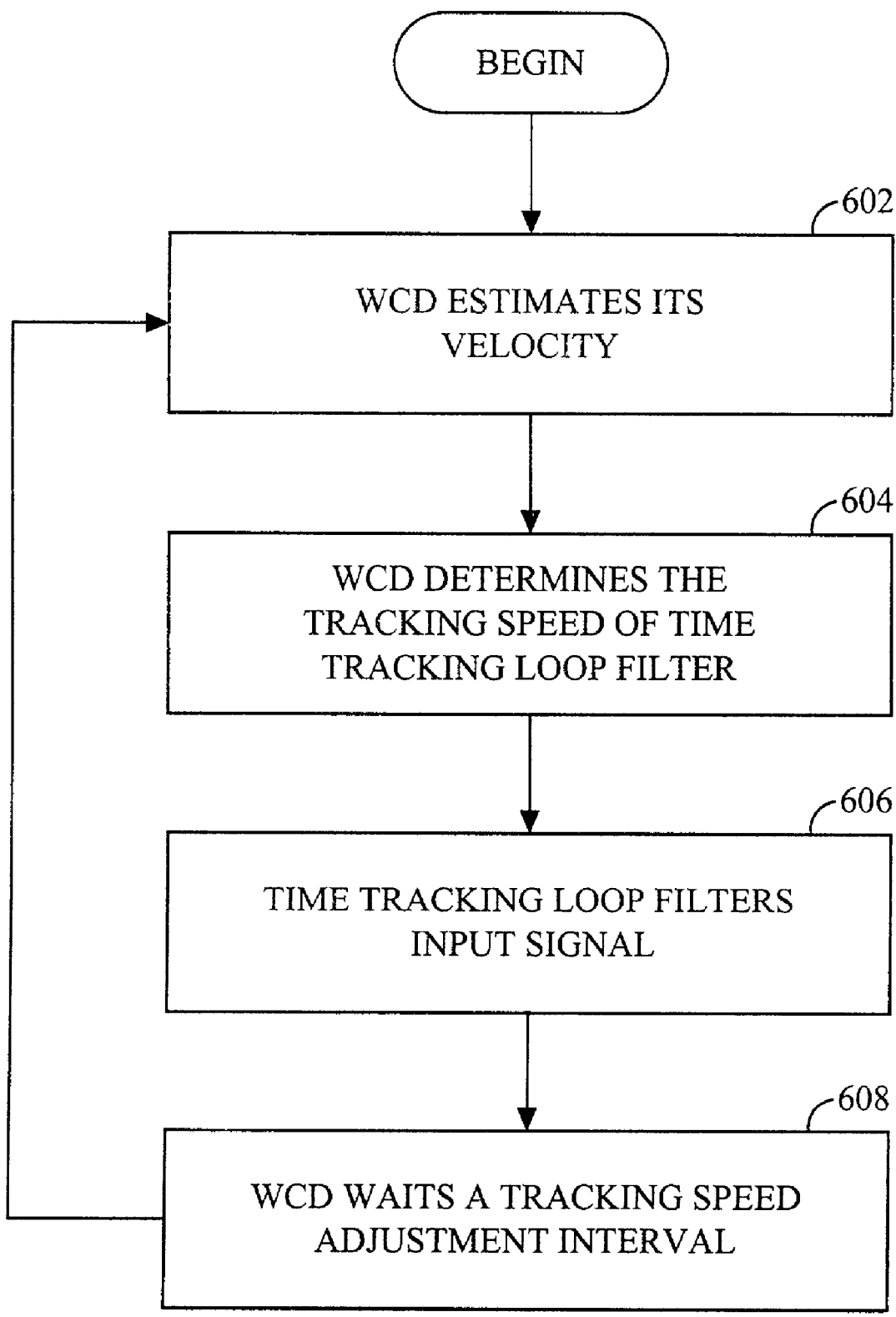
FIGS. 6 and 7 are flowcharts illustrating operational sequences involving velocity responsive time tracking.

FIG. 6 is a flowchart of an operational sequence involving velocity responsive tracking of a timing reference in pilot signals received by WCD 106. This operational sequence begins with a step 602, where WCD 106 estimates its velocity. This step is performed by velocity estimator 212 and comprises generating velocity estimate signal 242, which is sent to a time tracking loop filter 318 in each finger 208.

Next, in a step 604, WCD 106 determines the tracking speed of time tracking loop filter 318. In step 604, velocity to gain translation module 502 adjusts the tracking speed of time tracking loop filter 318 by adjusting its bandwidth. This tracking speed adjustment comprises varying the value of gain signal 520.

In step 604, velocity to gain translation module 502 may determine the tracking speed according to different strategies. For instance, step 604 may comprise increasing the tracking speed as the estimated velocity increases. Similarly, step 604 may comprise decreasing the tracking speed as the estimated velocity decreases. Moreover, step 604 may comprise changing the tracking speed from a first speed to a second speed when the estimated velocity surpasses a velocity threshold, $V_U$. This second speed may be either greater than or less than the first speed.

In a step 606, a timing error signal, such as discriminator signal 360, is filtered by time tracking loop filter 318. This filtering produces a control signal that controls the timing of a synchronization clock, such as finger clock 319.

Steps 602 through 606 may be performed at periodically occurring time increments. Thus, in a step 608, WCD 106 waits a tracking speed adjustment interval before returning operation to step 602.

Figure 7:
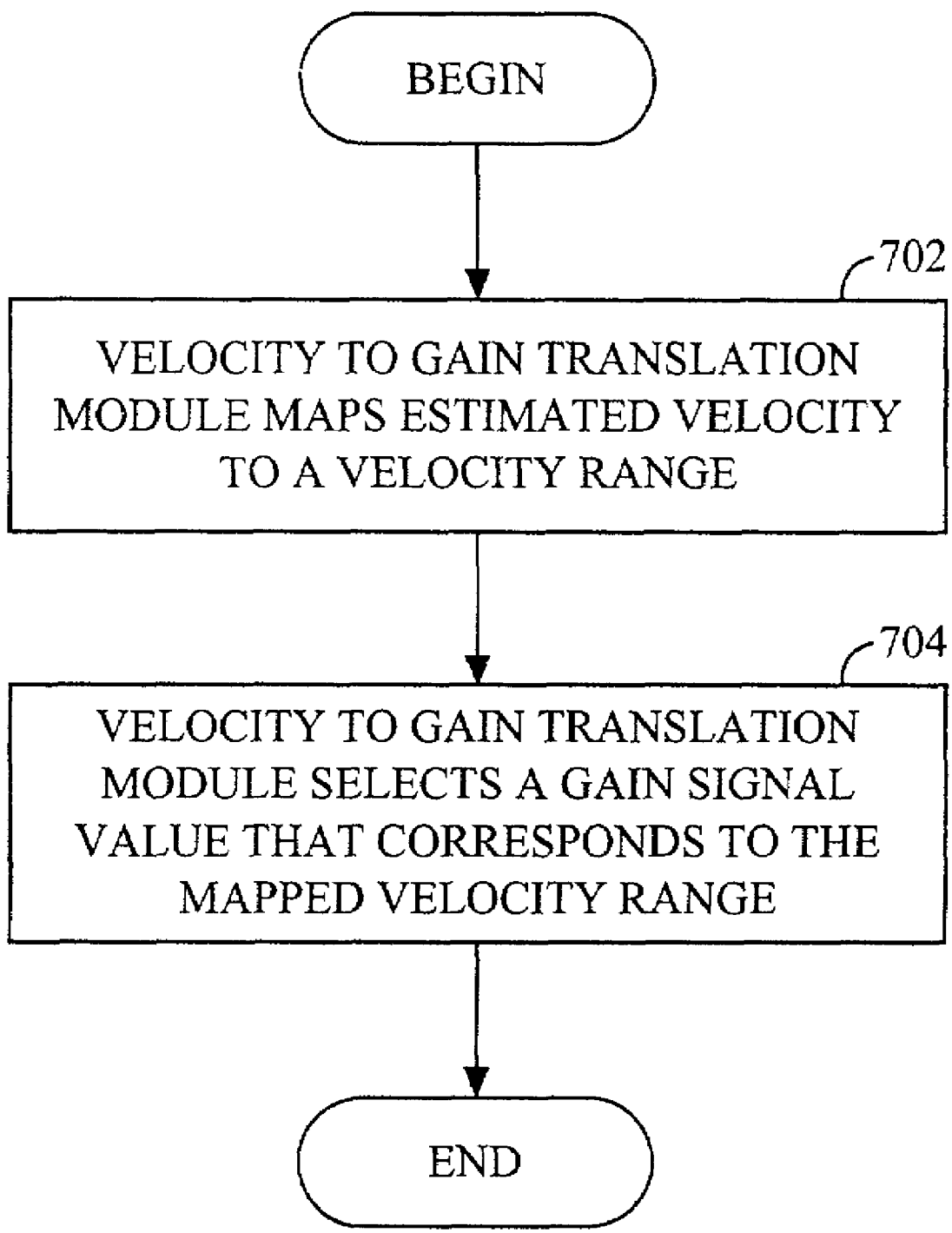

FIG. 7 is a flowchart illustrating step 604 in greater detail. This performance begins with a step 702, where velocity to gain translation module 502 maps the velocity estimated in step 602 to a velocity range.

Next, in a step 704, velocity to gain translation module 502 selects a value for gain signal 520 that correlates the velocity range to the tracking speed of time tracking loop filter 318. Velocity to gain translation module 502 may store these velocity ranges and corresponding gain signal values in a lookup table (not shown). Thus, step 704 may comprise accessing a gain signal value from a lookup table according to the velocity estimated in step 602.

Figure 8A:
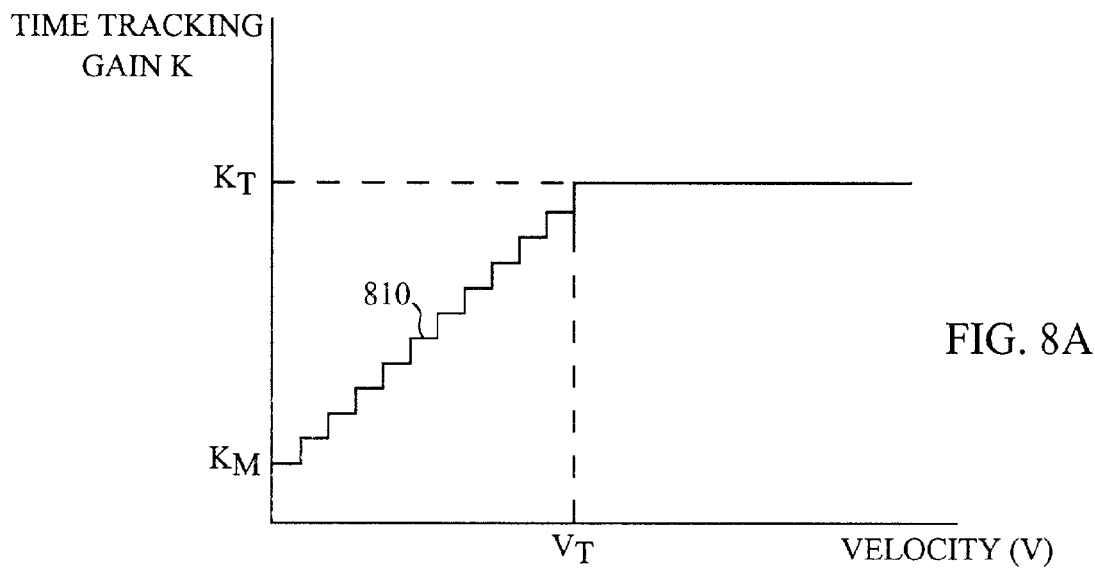
FIGS. 8A-8C are charts that provide exemplary mappings between velocity ranges and gain signal values.
Figure 8B:
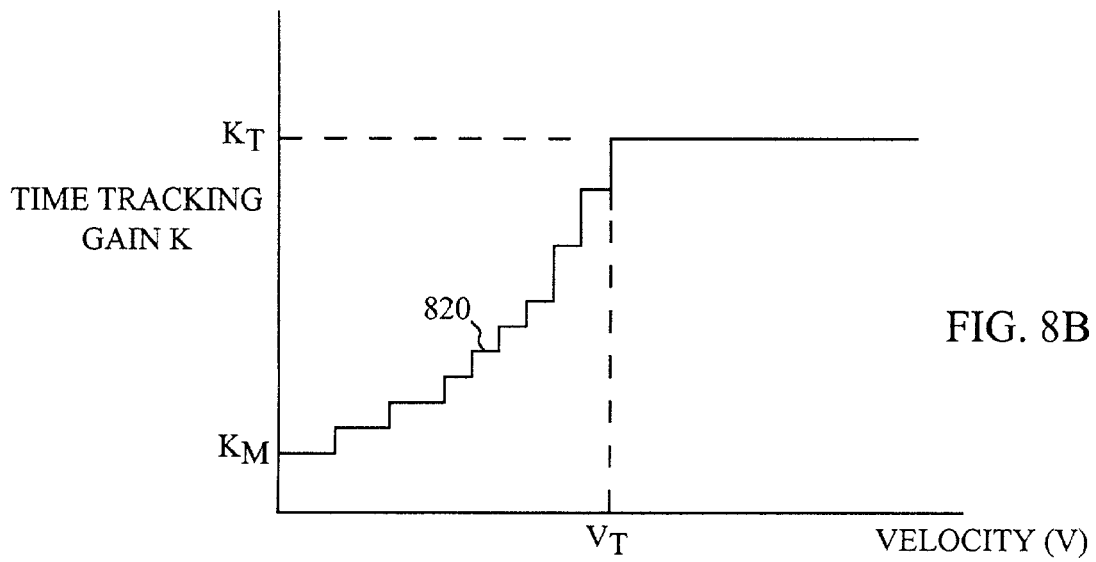
Figure 8C:
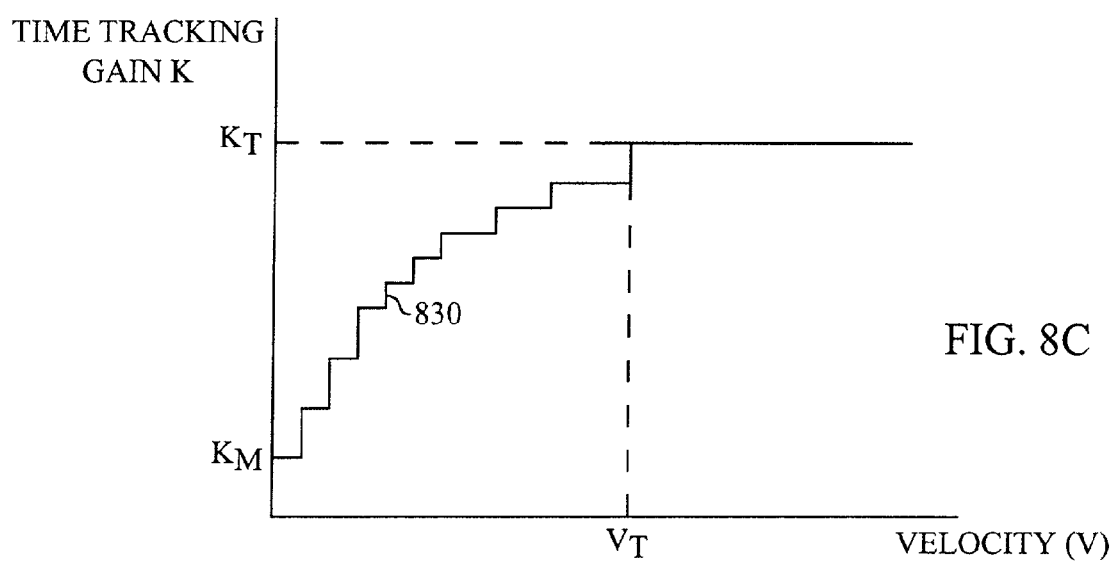

Performance of step 704 selects from one or more gain signal 520 values that each correspond to a particular velocity range. FIGS. 8A-8C are charts that provide exemplary mappings between velocity ranges and gain signal 520 values. Each of these mappings provides a range of gain signal 520 values that begins at KM for zero velocity and increases to a KT for velocities greater than or equal to a velocity threshold, $V_T$.

FIG. 8A illustrates a first mapping 810 that provides an approximated linear pattern between zero velocity and $V_T$. FIG. 8B illustrates a second mapping 820 that provides a concave up non-linear pattern between zero velocity and $V_T$. FIG. 8C illustrates a third mapping 830 that provides a concave down non-linear pattern between zero velocity and $V_T$.

These exemplary mappings may be implemented by a lookup table in velocity to gain translation module 502. Alternatively, velocity to gain translation module 502 may implement these mappings through a mathematical computation.

Velocity Estimator

As described above with reference to FIGS. 2 and 3, velocity estimator 212 receives control signal 244 from AGC module 206 and baseband pilot sequence set 338 from one of demodulation fingers 208. From these inputs, velocity estimator 212 generates velocity estimate signal 242, which is sent to demodulation fingers 208 to provide velocity-responsive time tracking.

Velocity estimator 212 utilizes fading characteristics of multipath transmissions to estimate the velocity of WCD 106. As described above, the physical terrain and structure surrounding WCD 106 create multiple signal paths from the base station 102 to WCD 106. Each multipath component can be modeled as a composite signal having a slow fade component and a fast fade component.

Figure 9:
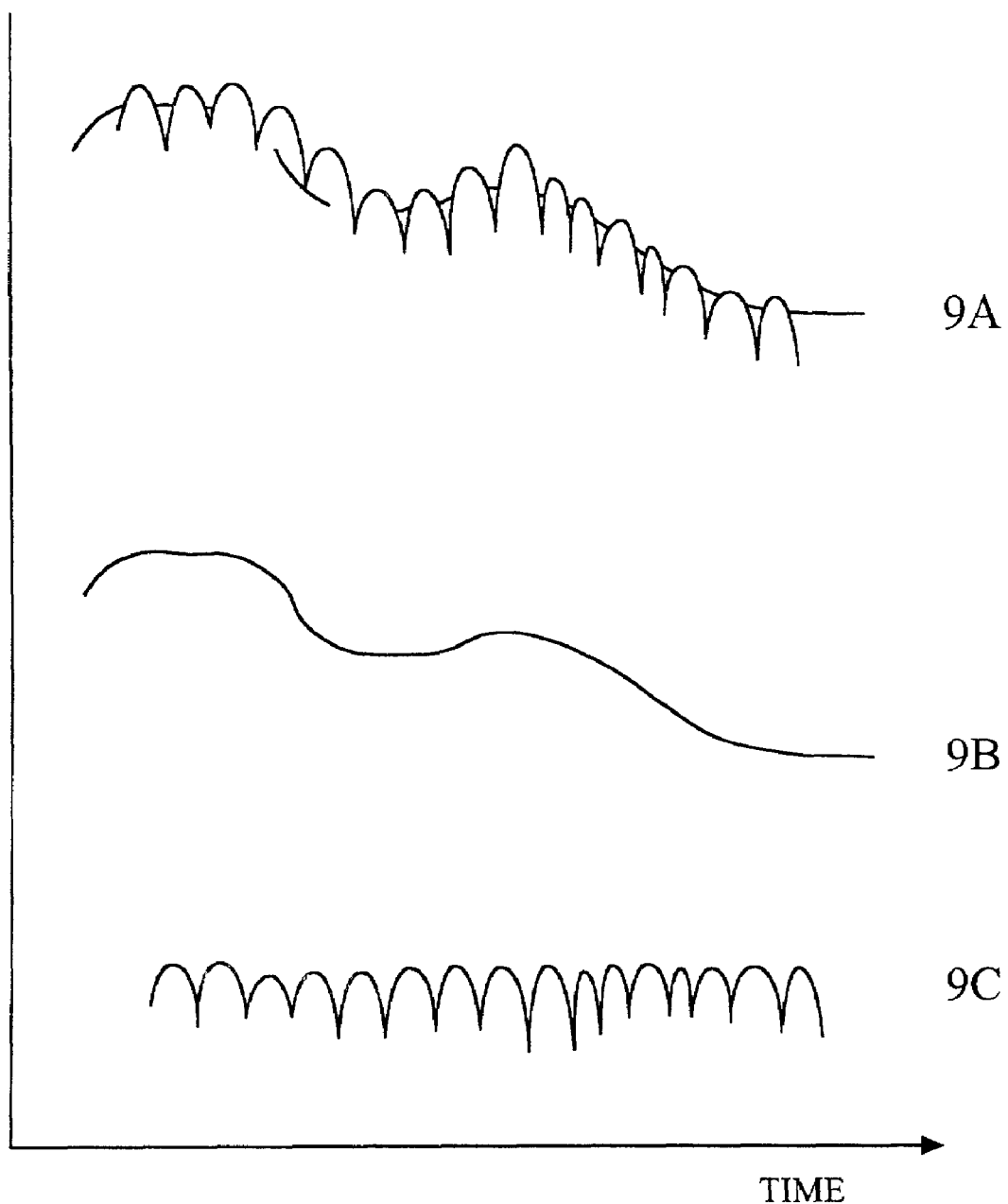
FIGS. 9A-9C are graphs illustrating multipath fading characteristics.

FIG. 9A provides an example of such a composite signal received by WCD 106. This signal exhibits a variation in time of the received signal power due to slow fade and fast fade components, is shown in FIG. 9A. The corresponding slow fade component of the composite received signal is shown in FIG. 9B. The corresponding fast fade, or Rayleigh fade, component of the composite received signal is shown in FIG. 9C. AGC module 206 is able to compensate for nearly all of the effects of such slow fading. Additionally, AGC module 206 is able to compensate for a portion of the effects of such Rayleigh fading.

Velocity estimator 212 performs measurements of the power in a single multipath component over time to estimate the velocity of WCD 106. These estimates are based on the number of times the power of this multipath component crosses one half of its RMS power level in a given period of time. This quantity is referred to herein as the level crossing rate.

More particularly, velocity estimator 212 bases the value of velocity estimate signal 242 upon the number of times the fast fade portion of a multipath signal component crosses the one half RMS power level threshold over a given period of time. This threshold is not the only threshold that can be used for velocity estimation. Any other fraction or multiple of the RMS power level may be chosen as the threshold level. However, using one half of the RMS power level as a threshold results in a maximum level crossing rate for a given velocity.

Since velocity estimator 212 estimates the power of a single multipath component, it processes a baseband pilot sequence set 338 from one of demodulation fingers 208, which represents an isolated multipath pilot signal.

Since AGC module 206 maintains signal set 220 at a substantially constant power level, it essentially eliminates information that is needed for velocity estimator 212 to estimate the power of a multipath component, as received through antenna segment 202. Therefore, to measure the power of an isolated multipath component, the gain adjustments performed by AGC module 206 must be removed.

Figure 10:
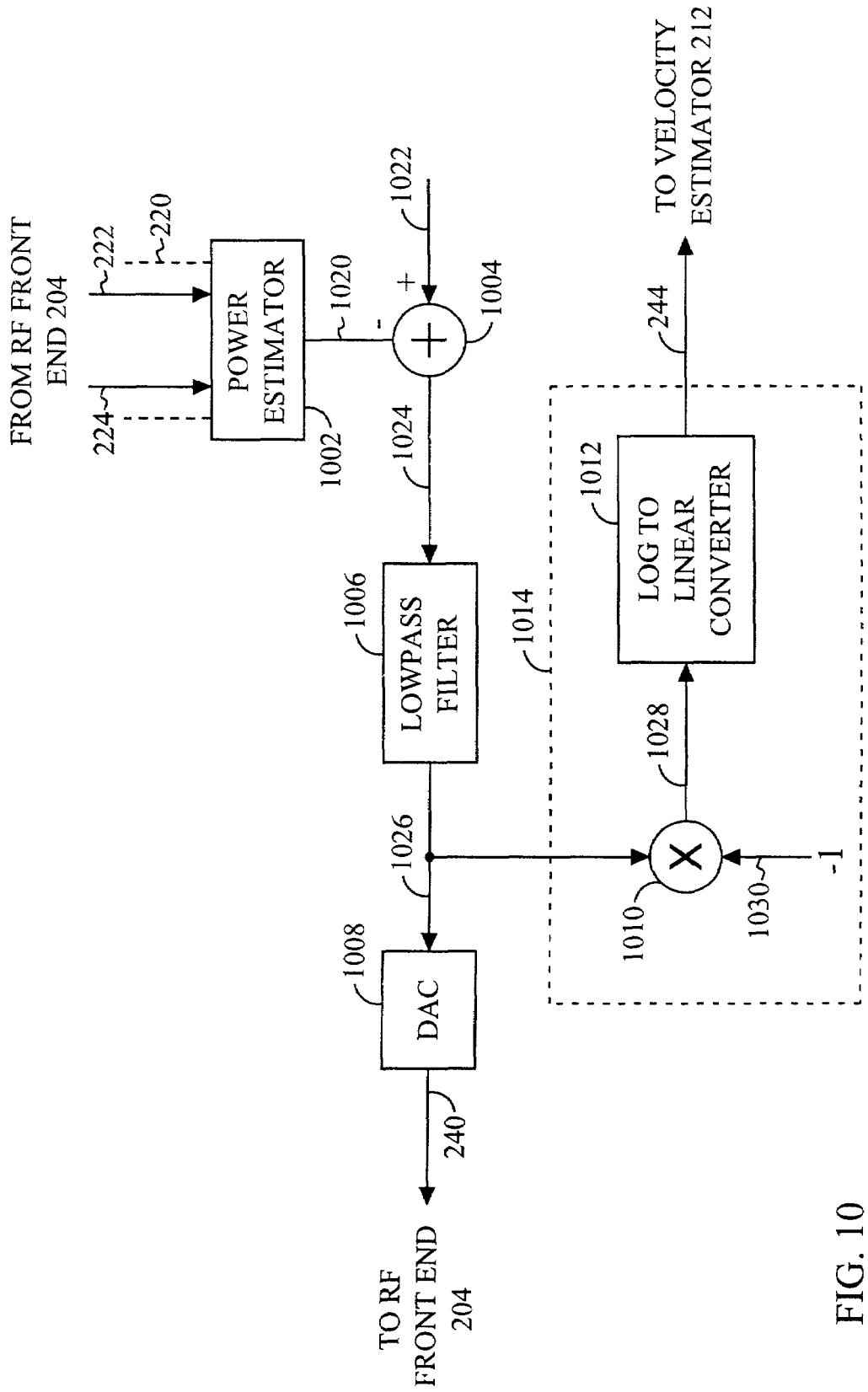
FIG. 10 is a block diagram illustrating an implementation of an automatic gain control module.

The gain adjustment effects of AGC module 206 are removed by a scaling feature that adjusts amplified signals by the inverse of the gain controlled by AGC module 206. FIG. 10 is a block diagram illustrating an implementation of AGC module 206 that provides such a scaling feature.

FIG. 10 shows a power estimator 1002, a summation node 1004, a lowpass filter 1006, a digital to analog converter (DAC) 1008, an inverting node 1010, and a log to linear converter 1012. Together, inverting node 1010, and log to linear converter 1012 are included in a scaling module 1014.

Power estimator 1002 receives baseband signal set 220 (i.e., signal components 222 and 224) and estimates its instantaneous power. Power estimator 1002 outputs a power estimate signal 1020 that is sent to summation node 1004. At summation node 1004, power estimate signal 1020 is subtracted from a predetermined set point 1022. Predetermined set point 1022 is chosen to represent a power value near the upper bound of analog to digital converter(s) (ADCs) within RF front end 204 that are employed to produce baseband signal set 220. When power estimate signal 1020 exceeds set point 1022, summation node 1004 produces an adjustment signal 1024 that reduces the gain of amplification components within RF front end 204. However, when power estimate signal 1020 is less than set point 1022, adjustment signal 1024 increases the gain of such amplification components.

Adjustment signal 1024 is sent to low pass filter 1006, which produces a digital control signal 1026. Digital control signal 1026 is sent to (DAC) 1008 to generate gain control signal 240, which is sent to RF front end 204. DAC 1008 may be removed for implementations of RF front end 204 that receive digital gain control signals 240. As described above, amplification components within RF front end 204 vary their gain according to the value of gain control signal 240.

Digital control signal 1026 is also sent to scaling component 1014, where it is input to inverting node 1010. Inverting node 1010 is shown as a multiplier having a multiplication factor of −1. However, other suitable implementations may be employed. Inverting node 1010 generates an inverted control signal 1028, which is sent to log to linear converter 1012. Log to linear converter 1024 operates according to a transfer function. This transfer function is the inverse of the function that defines the relationship between gain control signal 240 values and amplification gain of RF front end 204. As a result of this transfer function, log to linear converter 1024 produces voltage estimate 244, which is an estimate of the component signal's voltage, as received through antenna segment 202.

Scaling module 1014 provides sufficient signal processing to allow an accurate determination of the level crossing rate when the SNR of a received signal is high. This is because noise components in the received signal are insignificant in relation to the received signal power and thus do not adversely contribute to the determination of the level crossing rate. However, when noise components represent a significant contribution to the total power of a received signal, the noise components adversely contribute to the determination of the level crossing rate when a single threshold is used.

The frequency of a composite signal's fast fading component can be estimated using the expected velocity range that the receiver will experience. The pilot integration time must be sufficiently less than the period of the fast fade in order to reliably detect level crossings. Because this amount of time is finite when the channel exhibits fading, measured pilot power has a certain amount of noise associated with it. This amount of noise may be represented as an SNR measurement.

The SNR of an integrated pilot signal's power is directly proportional to a quantity expressed below in Equation (3).

$$Iorhat_0 * (Ecp/Ior)(Ioc+Nt) \qquad (3)$$

In Equation (3), $Iorhat_0$ represents the amount of signal power received at WCD 106 in a path 0, (Ecp/Ior) represents the ratio of pilot signal energy to the total energy transmitted at base station 102, and (Ioc+Nt) represents the total interference due to adjacent base stations and thermal noise.

Therefore, as indicated by Equation (3), when the total receive power of a pilot signal is low or when its associated levels of interference and noise are high, the measurement of a pilot signal's power is noisy. This noise causes the estimate of the pilot signal's power to traverse a level crossing threshold value many times. In contrast, when a pilot signal is received in a noise free system, its power traverses a level crossing threshold value only once.

In order to decrease the effect of a pilot signal's SNR on its level crossing rate, velocity estimator 212 employs level crossing hysteresis. This hysteresis feature employs a high threshold and a low threshold. According to this feature, a signal's amplitude is not considered to cross the employed threshold level unless it starts below the lower hysteresis threshold (which is set N dB lower than the employed threshold level) and then crosses the upper hysteresis threshold (which is set M dB higher than the employed threshold level), or vice versa.

For a particular signal, the threshold level that results in a maximum number of level crossings is one half of the signal's RMS signal power. However, any level relative to the RMS power level may be used. In an exemplary implementation, M and N are each set to 3 dB. However, these values may differ.

Therefore, the hysteresis feature employed by velocity estimator 212 prevents small changes in the measurement of a signal's amplitude that are less than (N+M) dB from getting considered in level crossing rate computations. The level hysteresis algorithm employed by velocity estimator 212 can be expressed by the following pseudocode. In this pseudocode, s(n) represents the symbol amplitude at a time n, $T_H$ represents a high hysteresis threshold level, and $T_L$ represents a low hysteresis threshold level.

```
if (s(n) < TL) {
    if (thresholdFlag == 0) {
        levelCrossingCounter++;
    }
    thresholdFlag = 1;
}
else if (s(n) > TH) {
    if (thresholdFlag == 1)
        levelCrossingCounter++;
    }
    thresholdFlag = 0;
}
```

Figure 11:
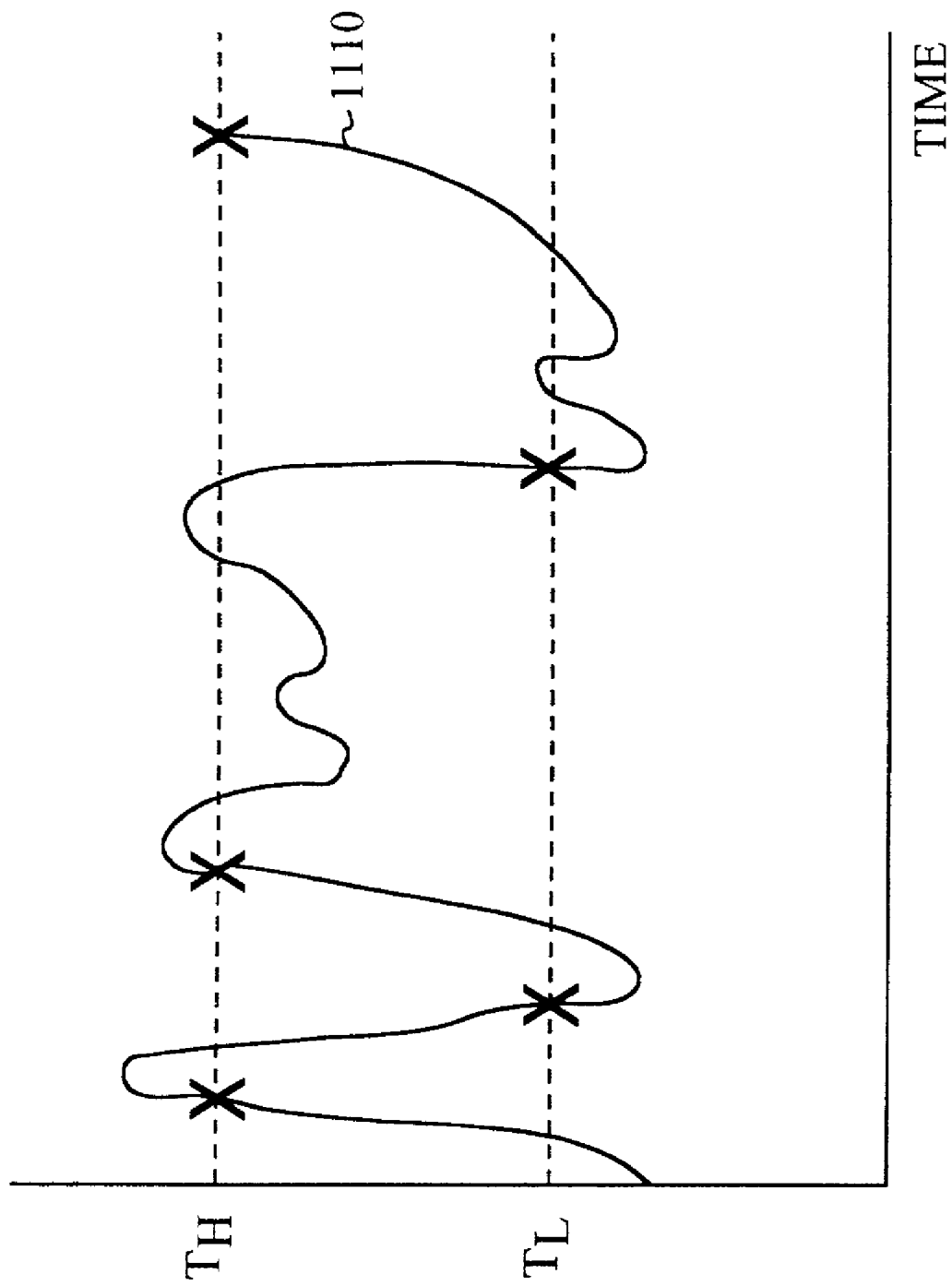
FIG. 11 is a graph showing an estimate of a signal in a noisy environment.

FIG. 11 is a graph showing an application of the level hysteresis algorithm to a multipath 1110 over time in a noisy environment. Ordinarily, fast fading produces signals, such as the one shown in FIG. 9C. However, contributions from noise components result in a noisy estimate of the multipath signal. This high hysteresis threshold is denoted as $T_H$ and the lower hysteresis threshold is denoted as $T_L$. The predetermined threshold level to determine level crossings (not shown) is at a power level that is between hysteresis thresholds $T_H$ and $T_L$. When the hysteresis algorithm is applied to this noisy signal estimate, level crossings are considered to occur only at points denoted in FIG. 11 by "X".

Figure 12:
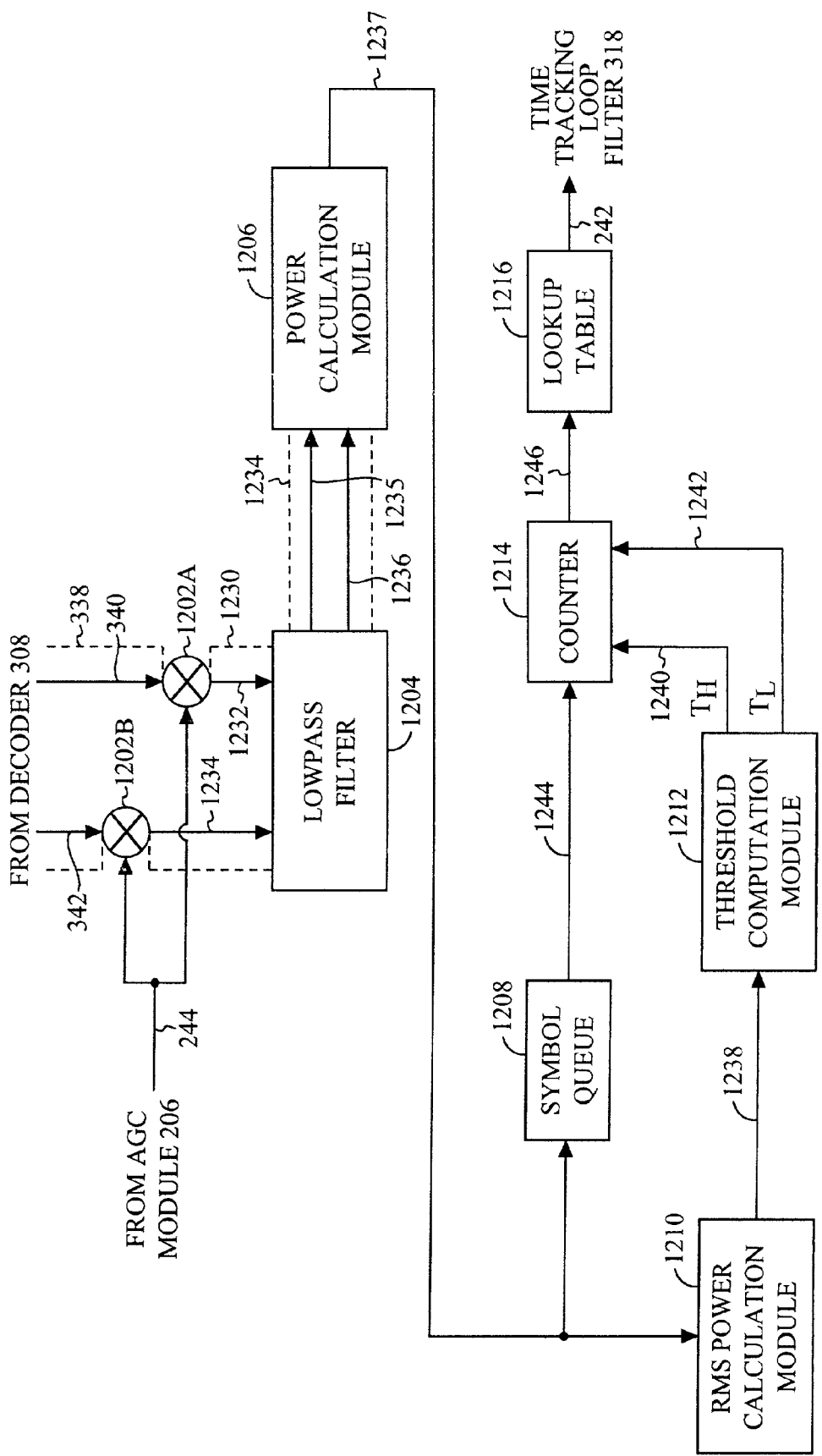
FIGS. 12 and 13 are block diagrams showing velocity estimator implementations.

FIG. 12 is a block diagram illustrating a first implementation of velocity estimator 212, which employs the hysteresis algorithm described above. This implementation includes multiplication nodes 1202a and 1202b, a lowpass filter 1204, a power calculation module 1206, a symbol queue 1208, an RMS power calculation module 1210, a threshold computation module 1212, a counter 1214, and a lookup table 1216.

A voltage estimate 244 is received from AGC module 206 at multiplication nodes 1202a and 1202b. At these nodes, voltage estimate 244 is multiplied with a corresponding sequence within baseband pilot sequence set 338.

Multiplication nodes 1202a and 1202b produce a sequence set 1230 that represents baseband sequence set 338 with the power stabilization effects of AGC module 206 removed. Sequence set 1230 includes an in-phase sequence 1232 and a quatrature sequence 1234.

Sequence set 1230 is sent to low pass filter 1204, which produces a filtered sequence set 1234 including in-phase sequence 1235 and quadrature sequence 1236. Power calculation module 1206 receives filtered sequence set 1234 and calculates its instantaneous power.

To calculate instantaneous power, power calculation module 1206 computes the sum of the squares of each sequence within filtered sequence set 1234 and calculates the square root of this sum. Power calculation module 1206 outputs this instantaneous power as energy sequence 1237. Power signal 1237 is sent to queue 1208 and RMS power calculation module 1210.

RMS power calculation module 1210 calculates a RMS power sequence 1238 using a predetermined number of consecutive values of energy sequence 1237. The RMS power sequence value is sent to threshold computation module 1212. Threshold computation module 1212 uses the predetermined hysteresis values (M and N) as described above to calculate upper and lower level crossing thresholds 1240 and 1242. These thresholds are coupled to a level crossing counter 1214.

Queue 1208 is a first-in-first-out (FIFO) buffer. Queue 1208 has a depth that corresponds to the number of symbols used in the running calculations performed by RMS power calculation module 1210. Thus, symbol queue 1208 delays energy sequence 1237 and sends a delayed energy sequence 1244 to counter 1214.

Counter 1214 counts the number of level crossings of energy sequence 1244 using thresholds 1240 and 1242 to provide hysteresis in the counting. In performing such counting, counter 1214 outputs a count 1246, which is sent to lookup table 1216.

Lookup table 1216 maps the number of level crossings (as indicated by count 1246) that occur in a given period of time to an estimated velocity. The velocity estimate is output as velocity estimate 242. Alternatively, velocity estimator 212 may be implemented without lookup table 1216. In such implementations, count 1246 is used directly as a velocity estimate.

Figure 13:
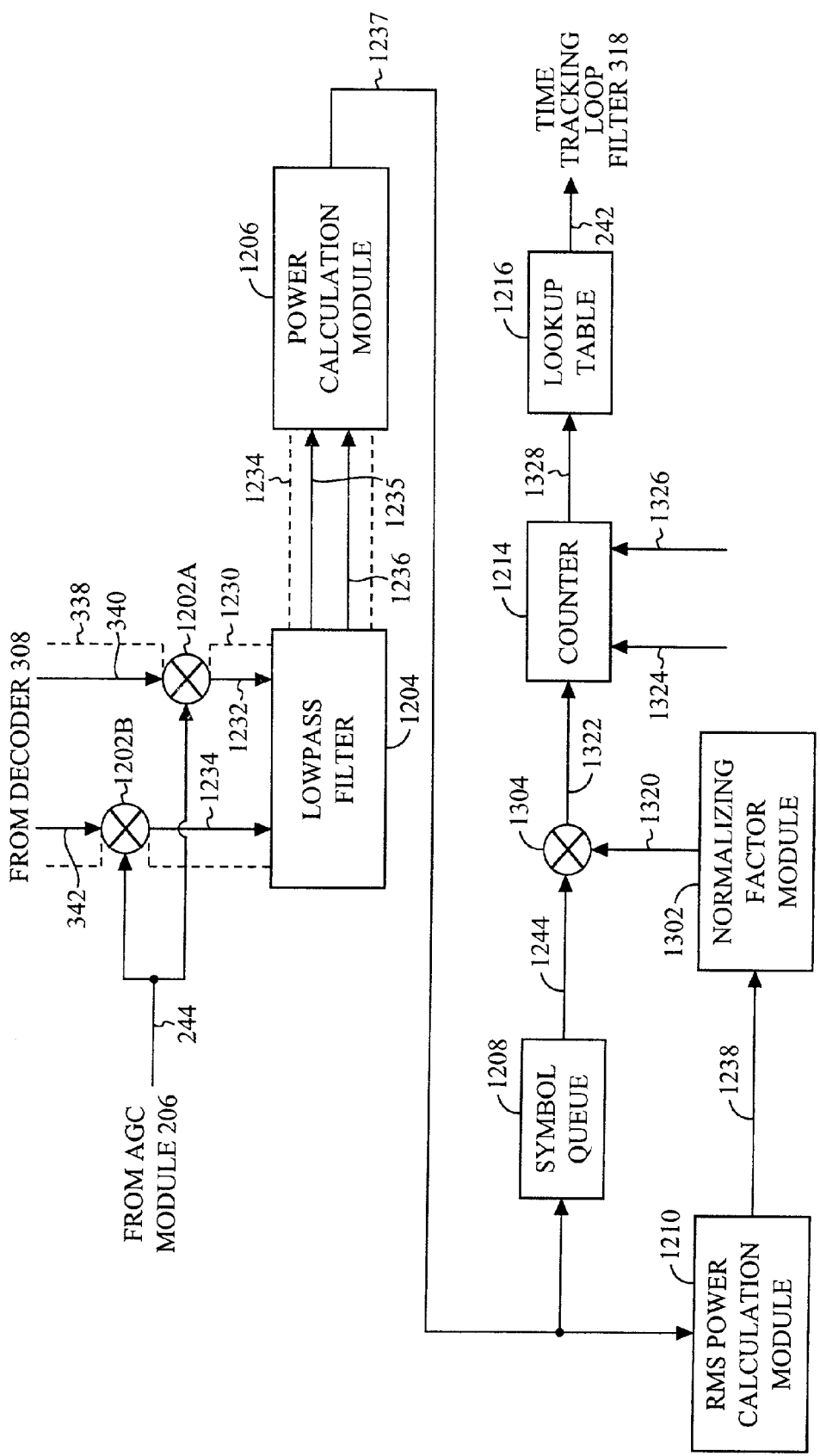

A second implementation of velocity estimator 212 is shown in FIG. 13. This implementation is similar to the implementation shown in FIG. 12. In fact, both implementations are the same from the reception of voltage estimate 244 to the generation of energy sequence 1237. However, the second implementation calculates level crossings in a different manner.

In the second implementation, energy sequence 1237 is sent to queue 1208 and RMS power calculation module 1210, as in the first implementation. However, in the second implementation, RMS power calculation module 1210 sends RMS power sequence 1238 to a normalizing factor module 1302. Normalizing factor module 1302 calculates and outputs 2/x, where x represents RMS power sequence 1238 and 2/x is a normalizing factor 1320.

Normalizing factor 1320 is sent a multiplication node 1304, which also receives delayed energy sequence 1244 from queue 1208. Multiplication node 1304 multiplies these inputs and generates a normalized sequence 1322. Normalized sequence 1322 represents delayed energy sequence 1244 normalized by one-half of RMS power sequence 1238.

Normalized sequence 1322 is sent to counter 1214, which counts the number of level crossings of sequence 1322. However, unlike the implementation of FIG. 12, where counter 1214 receives varying hysteresis thresholds, in the implementation of FIG. 13, counter 1214 receives hysteresis thresholds that remain constant. These constant thresholds are shown in FIG. 13 as high threshold 1324 and low threshold 1326. This implementation may employ constant hysteresis values because sequence 1322 is normalized by a value proportional to RMS power sequence 1238.

Counter 1214 outputs a count 1328, which is sent to lookup table 1216 to determine velocity estimate 242. In the second implementation, as in the first implementation, lookup table 1216 is optional. Thus, count 1328 may be used directly, or velocity estimate 242 may be calculated from it.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For instance, the above description involves signal and symbol sets having in-phase and quadrature components. These sets are associated with QPSK modulation. However, the present invention may employ other types of signal sets that are associated with other modulation techniques. These sets may include any number of components. For example, such sets may be associated with binary phase shift keying (BPSK) and include only a single component.

Furthermore, the invention is not limited to velocity estimation techniques that receive information from a single demodulation finger. In fact, the present invention includes techniques that estimate velocity based on information received from more than one demodulation finger.

Likewise, although the implementations of velocity estimator 212 described above perform velocity estimation using level crossing measurements, velocity estimator 212 may perform such estimation through other means, such as the periodic monitoring of the device's location using the global positioning system (GPS).

Also, implementations of time tracking loop filter 318 may include a plurality of filter paths, where each filter path receives a gain signal having a value that depends on the velocity of WCD 106.

Furthermore, the techniques of the present invention may be employed in other communications environments that do not involve IS-95 or CDMA.

What is claimed is:

1. A method of providing velocity responsive tracking of a timing reference in a signal received by a wireless communications device (WCD), comprising the steps of:
   estimating the velocity of the WCD;
   determining a tracking speed of a filter, the tracking speed corresponding to the estimated velocity, wherein determining the tracking speed comprises:
   mapping the estimated velocity to a velocity range; and
   selecting a speed that corresponds to the velocity range as the tracking speed; and
   filtering a timing error signal with the filter to produce a control signal that controls the timing of a synchronization clock.

2. The method of claim 1, wherein said determining step comprises increasing the tracking speed as the estimated velocity increases.

3. The method of claim 2, wherein said increasing step comprises increasing the filter bandwidth.

4. The method of claim 1, wherein said determining step comprises decreasing the tracking speed as the estimated velocity decreases.

5. The method of claim 4, wherein said decreasing step comprises decreasing the bandwidth of the filter bandwidth.

6. The method of claim 1, wherein said determining step comprises the step of:
   changing the tracking speed from a first speed to a second speed when the estimated velocity surpasses a velocity threshold, VU.

7. The method of claim 6, wherein the second speed is greater than the first speed.

8. The method of claim 1, wherein said determining step comprises the step of:
   changing the tracking speed from a first speed to a second speed when the estimated velocity is less than a velocity threshold, VL.

9. The method of claim 8, wherein the second speed is less than the first speed.

10. The method of claim 1, wherein said estimating step comprises the step of measuring a level crossing rate of a multipath signal.

11. The method of claim 1, wherein the synchronization clock is a finger clock that controls the timing of a pseudonoise (PN) sequence generator configured for despreading a pilot symbol sequence.

12. A system for providing velocity responsive tracking of a timing reference in a signal received by a wireless communications device (WCD), comprising:
   a velocity estimator that estimates the velocity of the WCD; and
   a filter having a tracking speed that corresponds to the estimated velocity, wherein said filter filters a timing error signal to produce a control signal that controls the timing of a synchronization clock, and wherein said filter maps the estimated velocity to a velocity range, and selects a speed that corresponds to the velocity range as the tracking speed.

13. The system of claim 12, wherein said filter increases the tracking speed as the estimated velocity increases.

14. The system of claim 12, wherein said filter decreases the tracking speed as the estimated velocity decreases.

15. The system of claim 12, wherein said filter changes the tracking speed from a first speed to a second speed when the estimated velocity surpasses a velocity threshold, VU.

16. The system of claim 15, wherein the second speed is greater than the first speed.

17. The system of claim 12, wherein said filter changes the tracking speed from a first speed to a second speed when the estimated velocity is less than a velocity threshold, VL.

18. The system of claim 17, wherein the second speed is less than the first speed.

19. The system of claim 12, wherein said velocity estimator measures a level crossing rate of a multipath signal to produce said velocity estimate.

20. The system of claim 12, wherein the synchronization clock is a finger clock that controls the timing of a pseudonoise (PN) sequence generator configured for despreading a pilot symbol sequence.

21. A system for providing velocity responsive tracking of a timing reference in a signal received by a wireless communications device (WCD), comprising:
   means for estimating the velocity of the WCD;
   means for determining a tracking speed of a filter, the tracking speed corresponding to the estimated velocity, wherein the means for determining the tracking speed comprises:
   means for mapping the estimated velocity to a velocity range; and
   means for selecting a speed that corresponds to the velocity range as the tracking speed; and
   means for filtering a timing error signal with the filter to produce a control signal that controls the timing of a synchronization clock.

22. The system of claim 21, wherein said determining means comprises means for increasing the tracking speed as the estimated velocity increases.

23. The system of claim 22, wherein said increasing means comprises means for increasing the filter bandwidth.

24. The system of claim 21, wherein said determining means comprises means for decreasing the tracking speed as the estimated velocity decreases.

25. The system of claim 24, wherein said decreasing means comprises means for decreasing the bandwidth of the filter bandwidth.

26. The system of claim 21, wherein said determining means comprises:
   means for changing the tracking speed from a first speed to a second speed when the estimated velocity surpasses a velocity threshold, VU.

27. The system of claim 26, wherein the second speed is greater than the first speed.

28. The system of claim 21, wherein said determining means comprises:
   means for changing the tracking speed from a first speed to a second speed when the estimated velocity is less than a velocity threshold, VL.

29. The system of claim 28, wherein the second speed is less than the first speed.

30. The system of claim 21, wherein said estimating means comprises means for measuring a level crossing rate of a multipath signal.

31. The system of claim 21, wherein the synchronization clock is a finger clock that controls the timing of a pseudonoise (PN) sequence generator configured for despreading a pilot symbol sequence.

* * * * *